US012650105B2

(12) United States Patent
Gurvich et al.

(10) Patent No.: US 12,650,105 B2
(45) Date of Patent: Jun. 9, 2026

(54) MEMBRANE DEOXYGENATION WITH ENHANCED STRUCTURAL INTEGRITY

(71) Applicant: Hamilton Sundstrand Corporation, Charlotte, NC (US)

(72) Inventors: Mark R. Gurvich, Middletown, CT (US); Alan F. Hunter, West Springfield, MA (US); Rebecca R. Stoner, North Granby, CT (US); Jay W. Kokas, Bloomfield, CT (US); Haralambos Cordatos, Colchester, CT (US); Andrew M. Caldecutt, Vernon, CT (US); Murtuza Lokhandwalla, South Windsor, CT (US)

(73) Assignee: Hamilton Sundstrand Corpration, Charlotte, NC (US)

( * ) Notice: Subject to any disclaimer, the term of this patent is extended or adjusted under 35 U.S.C. 154(b) by 572 days.

(21) Appl. No.: 18/189,696

(22) Filed: Mar. 24, 2023

(65) Prior Publication Data
US 2024/0318617 A1 Sep. 26, 2024

(51) Int. Cl.
*F02M 37/34* (2019.01)
*B01D 63/02* (2006.01)
*B01D 71/52* (2006.01)

(52) U.S. Cl.
CPC ............. *F02M 37/34* (2019.01); *B01D 63/02* (2013.01); *B01D 71/5222* (2022.08); *B01D 2325/028* (2013.01)

(58) Field of Classification Search
CPC .... F02M 37/34; B01D 63/02; B01D 71/5222; B01D 2325/028; B01D 53/22;
(Continued)

(56) References Cited

U.S. PATENT DOCUMENTS 5,156,656 A * 10/1992 Parker ................... C08G 65/48
96/13
5,264,171 A 11/1993 Prasad et al.
(Continued)

FOREIGN PATENT DOCUMENTS

EP 4088809 A1 11/2022

OTHER PUBLICATIONS

European Search Report for EP Application No. 24165839.2 dated May 16, 2024.

*Primary Examiner* — Hayden Brewster
(74) *Attorney, Agent, or Firm* — Carlson, Gaskey & Olds, P.C.

(57) ABSTRACT

A gas removal system includes an interior baffle with an outside surface having flow channels and a central fluid receiving chamber. A membrane fiber bundle with an inside surface is placed outwardly of the interior baffle. The member fiber bundle is formed of fibers that allow the passage of gas through an outer wall, but resist the passage of fluid with the inside surface of the fiber bundle partially contacting the outside surface of the baffle. The interior baffle and the fiber bundle extend between axial ends. A changed diameter portion is intermediate the axial ends wherein each of the outside surface of the interior baffle and the inside surface of the membrane fiber bundle change in diameter in a first direction and then return in a second direction changing diameter in an opposite radial direction from the first direction, and such that the changed diameter portion is intermediate the axial ends. A fuel system is also disclosed.

20 Claims, 10 Drawing Sheets

(58) Field of Classification Search
    CPC ........ B01D 2053/224; B01D 2257/104; B01D
                19/0031; B01D 2313/08; B01D 2313/10;
                                             B01D 63/025
    See application file for complete search history.

(56)                     References Cited

U.S. PATENT DOCUMENTS

| 5,450,516 | A | 9/1995 | Pasquali et al. | |
| 7,465,336 | B2 | 12/2008 | McHugh | |
| 2006/0243653 | A1 | 11/2006 | Heinrich et al. | |
| 2018/0071659 | A1* | 3/2018 | Rhoden | B01D 71/02232 |
| 2019/0030461 | A1 | 1/2019 | Dyer | |
| 2019/0329158 | A1 | 10/2019 | Dyer | |
| 2024/0238730 | A1* | 7/2024 | Berends | B01D 63/02 |

* cited by examiner

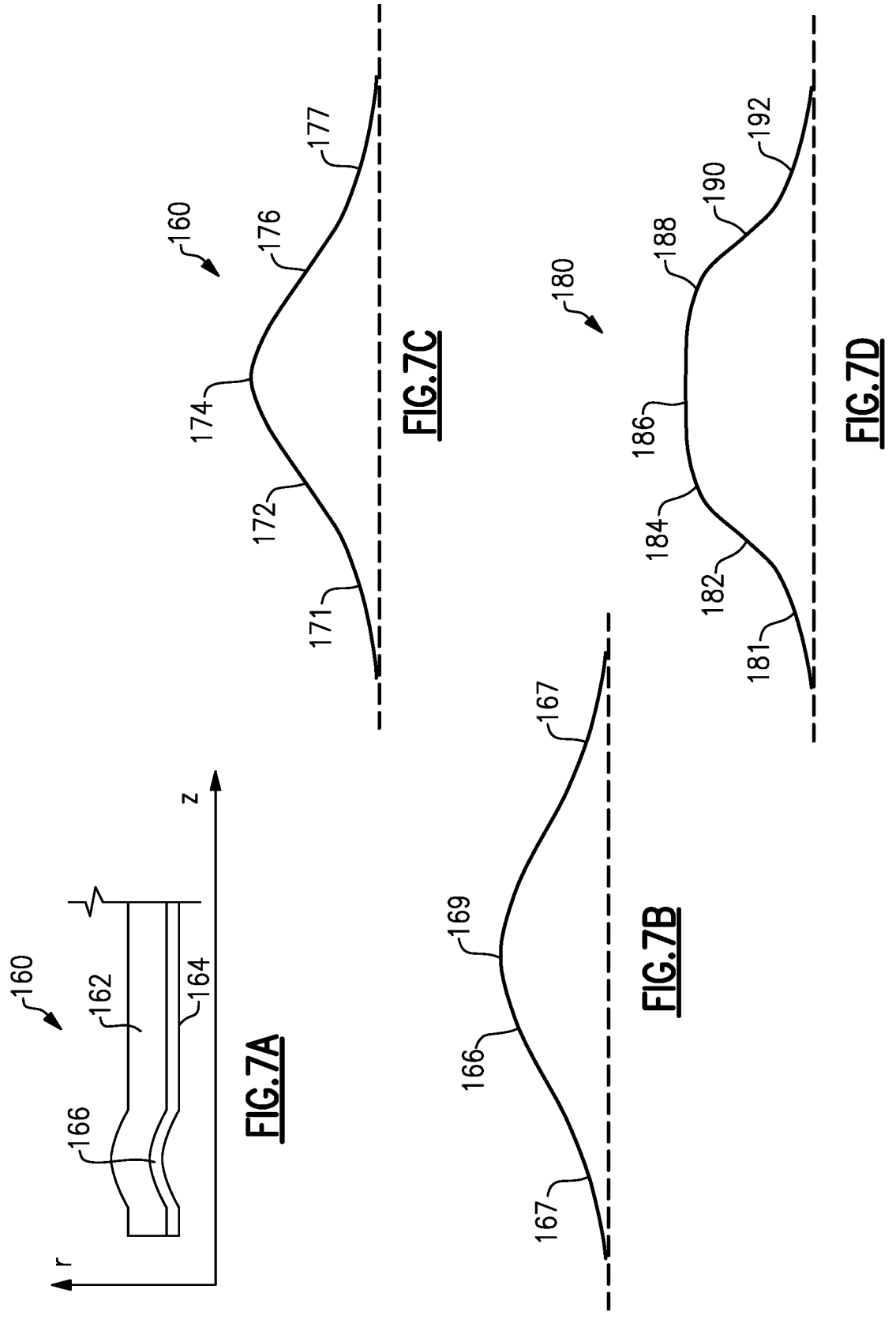

MEMBRANE DEOXYGENATION WITH ENHANCED STRUCTURAL INTEGRITY

BACKGROUND

This application relates to a deoxygenation system having a fiber membrane bundle surrounding an interior mandrel, and wherein there are sections of distinct diameters on each of the membrane fiber bundle and the mandrel providing a locking function.

Deoxygenation systems are known and often include a membrane fiber bundle wrapped around a mandrel, or baffle. An outer canister surrounds the membrane fiber bundle. Fuel is delivered into the interior of the baffle, and it passes radially outwardly across the membrane fiber bundle, and then returns through a tortuous path back radially inwardly and again outwardly for a number of times. The fibers in the membrane fiber bundle allow oxygen to pass through walls of the tube. In this way, oxygen is removed from the fuel prior to the fuel being delivered to a combustor for an engine, such as a gas turbine engine. Eliminating leakage is an important goal for deoxygenation systems.

SUMMARY

A gas removal system includes an interior baffle with an outside surface having flow channels and a central fluid receiving chamber. A membrane fiber bundle with an inside surface is placed outwardly of the interior baffle. The member fiber bundle is formed of fibers that allow the passage of gas through an outer wall, but resist the passage of fluid with the inside surface of the fiber bundle partially contacting the outside surface of the baffle. The interior baffle and the fiber bundle extend between axial ends. A changed diameter portion is intermediate the axial ends wherein each of the outside surface of the interior baffle and the inside surface of the membrane fiber bundle change in diameter in a first direction and then return in a second direction changing diameter in an opposite radial direction from the first direction, and such that the changed diameter portion is intermediate the axial ends.

These and other features will be best understood from the following drawings and specification, the following is a brief description.

BRIEF DESCRIPTION OF THE DRAWINGS

FIG. 7A shows the shape of an area on a section of one of the above-described embodiments as an axial cross-sectional view.

FIG. 7B shows an alternative shape to the section.

FIG. 7C shows yet another alternative shape.

FIG. 7D shows yet another alternative shape.

DETAILED DESCRIPTION

Figure 1:
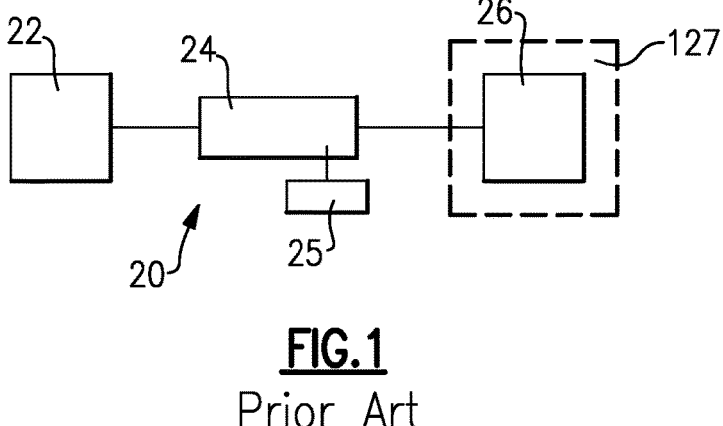
FIG. 1 schematically shows a fuel supply for a gas turbine engine.

FIG. 1 schematically shows a fuel supply system 20 for a gas turbine engine 127. A pump 22 delivers fuel through an oxygen removal system 24. A vacuum system 25 is shown schematically removing the oxygen from the oxygen removal system 24.

The fuel is then delivered into a combustor 26 of a gas turbine engine 127, shown schematically.

Figure 2:
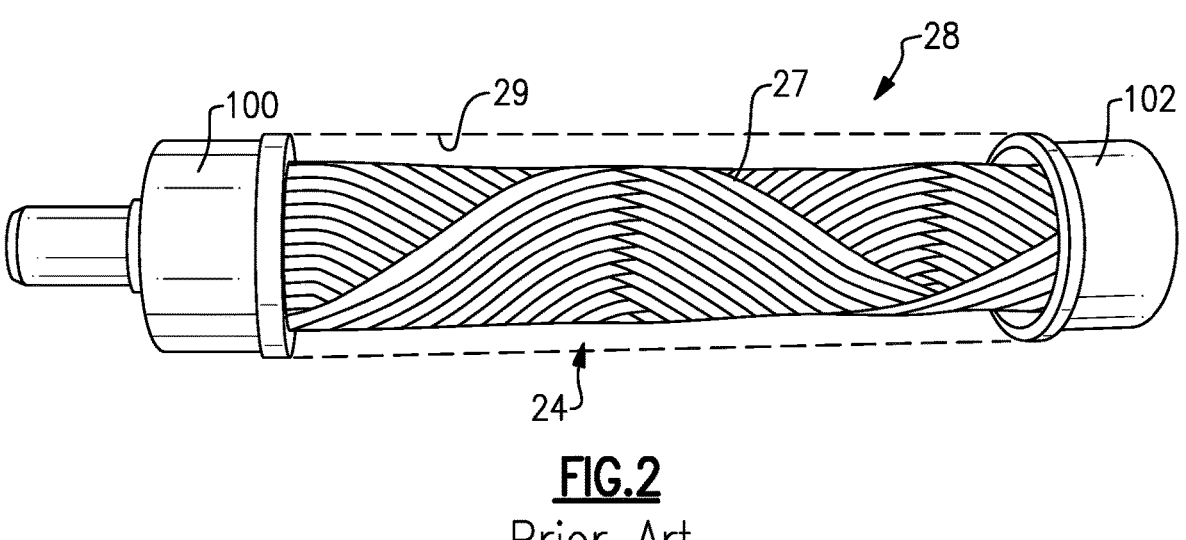
FIG. 2 shows a perspective view of a prior art fiber membrane bundle which might be utilized in the FIG. 1 system.

One type of oxygen removal system 24 is illustrated in FIG. 2. As shown, there is a bundle 28 of wrapped hollow tube membrane members 27 inward of a canister 29. The hollow tube membrane members 27 are formed of an appropriate plastic. In one example, the membranes may be formed of coated microporous polyetheretherketone ("PEEK") hollow tube-shaped members. A representative example of the coating is Teflon amorphous fluoropolymer (AF).

Fuel is passed within the bundle 28, and oxygen and other gasses are removed from the fuel by passing into the wall of the tubes. It should be understood that coatings such as a Teflon AF are highly permeable to oxygen and, therefore, this coating is applied on an outer surface of the membranes.

As shown in FIG. 2, tube bundle 28 has a plurality (a bundle) of hollow tube membrane members 27 which are wrapped at an angle with respect to the axial orientation of the bundle. In other embodiments, tube membrane members 27 can be wrapped at different angles or/and have varied angle(s) along orientations of the bundle.

An axial direction is defined from an inlet end 100 to an outlet end 102.

Figure 3:
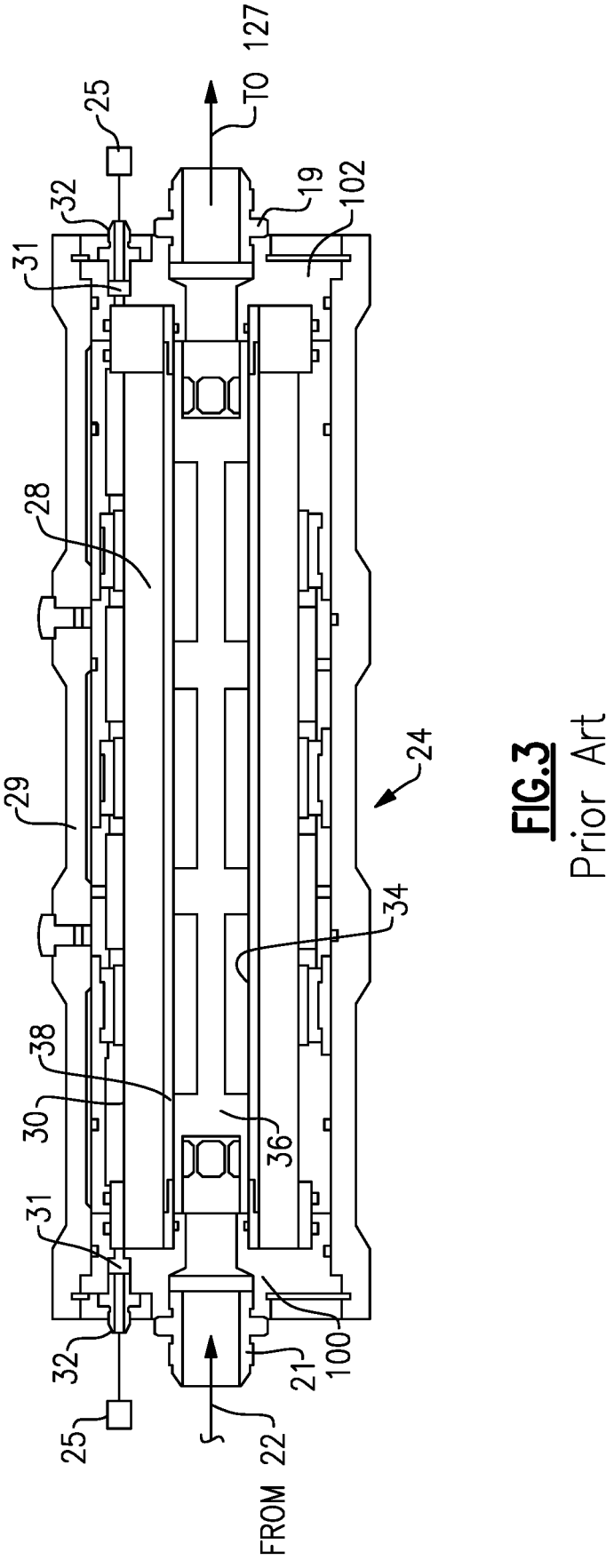
FIG. 3 shows a cross-sectional axial view of a prior art gas removal system.

FIG. 3 shows an assembled oxygen removal system 24.

The tube bundle 28 is positioned around an interior baffle 36. The fuel passes into an inlet port 21 from the fuel pump 22, and the baffles 36 cause the fuel to move radially inwardly and outwardly, and encounter the tube bundle 28.

The fuel eventually reaches a location downstream of the baffle 36 and exits to the engine 127 through an outlet port 19. Oxygen passes into an outer periphery of the tube members in the bundle 28 into chambers 31 inwardly of the outer canister 29. Ports 32 may be connected to a vacuum pump 25 to remove the oxygen. There is an area 38 inward of the inner periphery 34 of the bundle 28 that allows the fuel to flow along the inner periphery 34 as guided by the baffles 36. The system as described above is generally as known.

As mentioned above, there has sometimes been challenges with fuel leaking into the bundle, which is undesirable. Applicant has recognized that some of the leakage occurs due to localized damage in the fiber bundle 28 at least partially due to thermal strains and stresses. Applicant has recognized that this local damage is due to both loads and thermal deformation and thermal stresses. Applicant has recognized that the thermal stresses are a result of differences in coefficients of thermal expansion between different components in the system 24, and also a temperature range between the temperature at which the bundle 28 and system 24 were formed and assembled, and the temperature that they may be exposed to in practice.

Figures 4A, 4B:
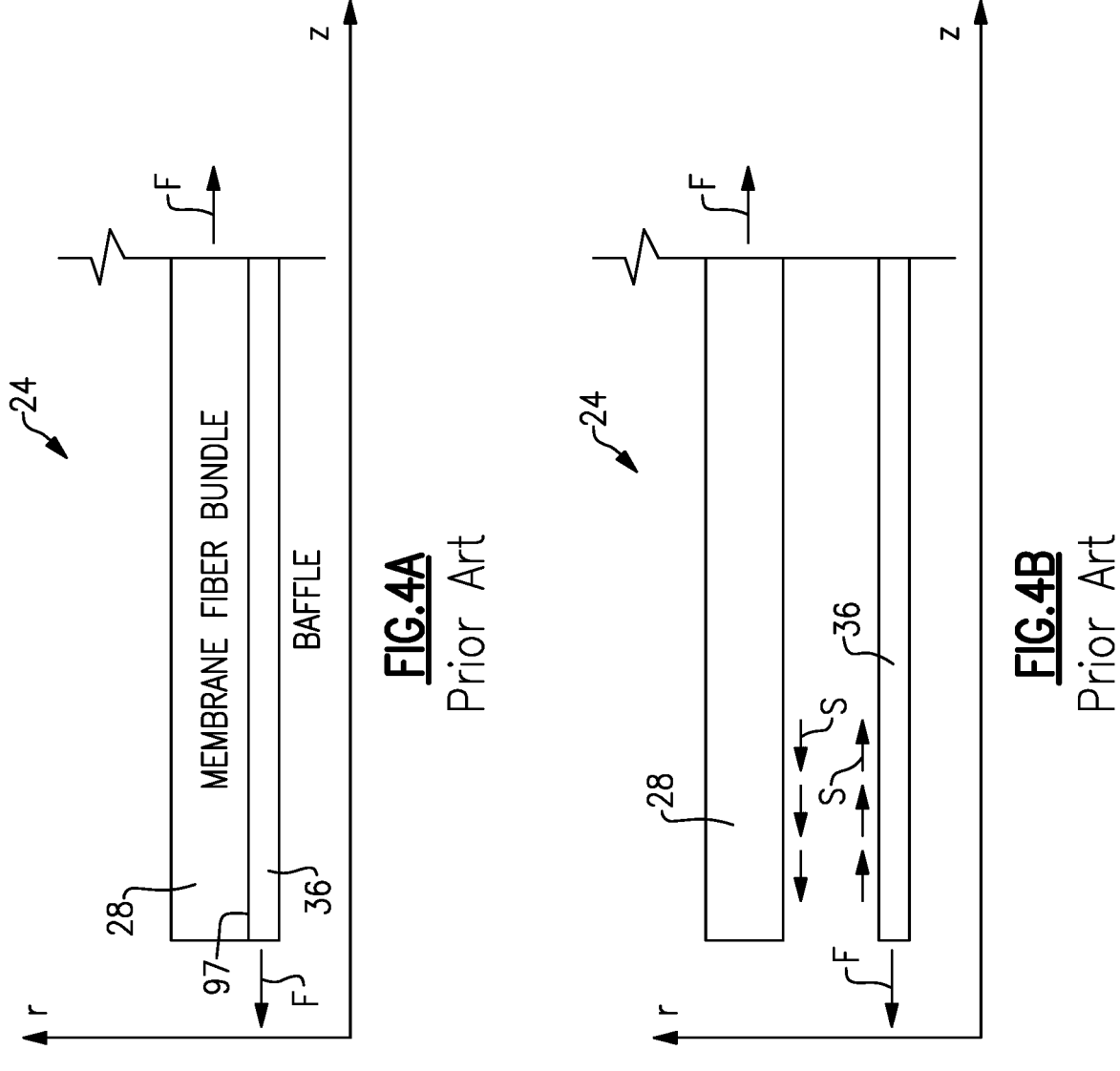
FIG. 4A shows schematically a problem with the prior art as an axial cross=sectional view.
FIG. 4B shows the impact of the FIG. 4A problem.

FIG. 4A illustrates schematically a problem with the prior art gas removal system 24. The membrane fiber bundle 28 is secured on an outer periphery 97 of the interior mandrel, or interior baffle 36. In practice, there may be load transfer between the baffle 36 and the bundle 28, for example, due to differences in axial thermal expansions, imperfections of installation, service conditions, etc. There could be tension or compression forces F. The load transfer between the baffle 36 and the bundle 28 is through adhesion at their mutual contact surfaces.

Thus, as shown in FIG. 4B, there are local shear stresses S between the outer periphery of the baffle 36 and the inner periphery of the bundle 28. The orientation of the shear stresses S in FIG. 4B is shown for an example of tension by force F. This can create a risk of damage to the interface. Applicant has found that due to this, there is often leakage adjacent the ends of the combined structure.

Figures 5A, 5B:
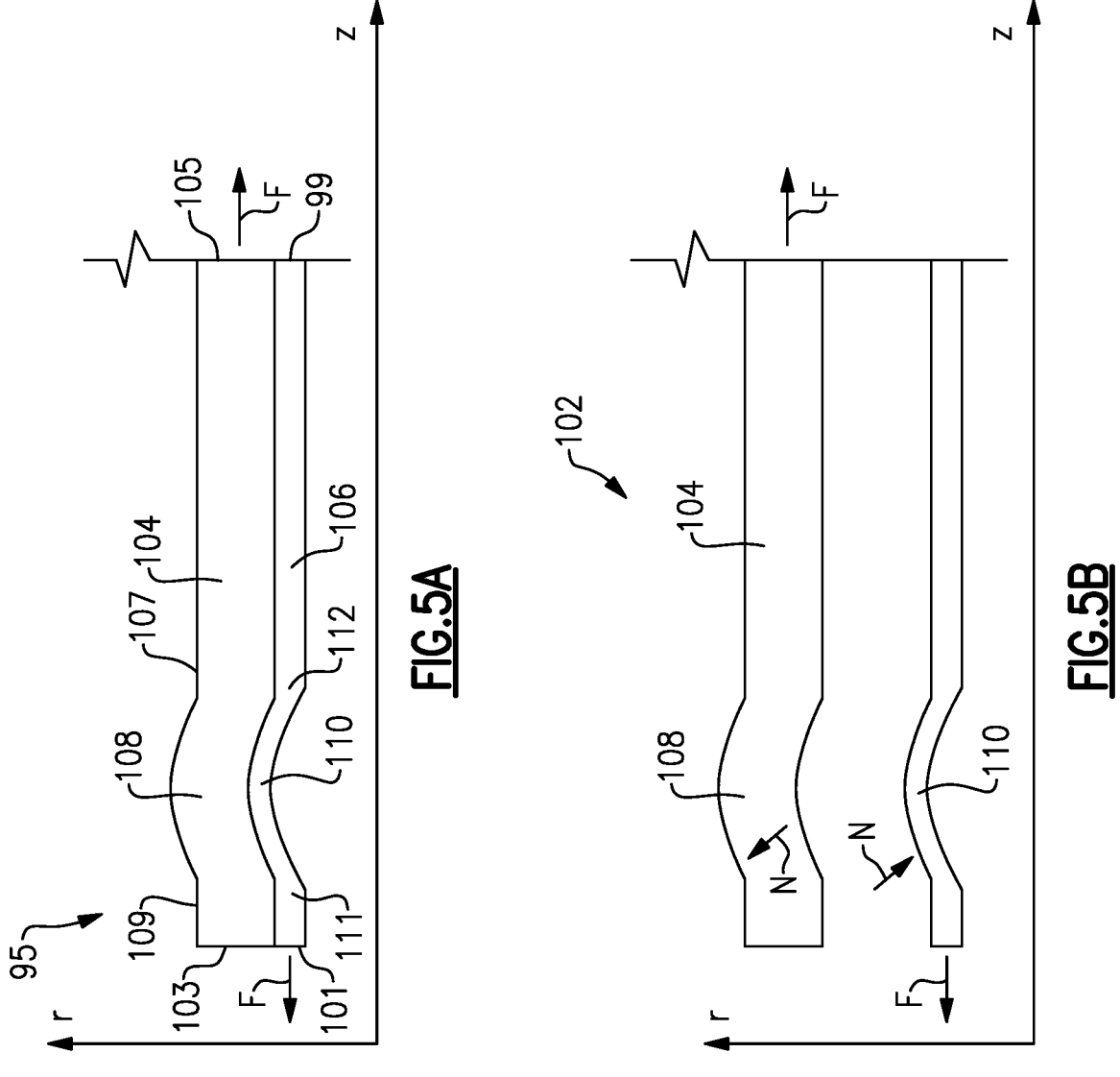
FIG. 5A shows a first embodiment gas removal system as an axial cross-sectional view.
FIG. 5B shows the schematic force equilibrium achieved by the FIG. 5A embodiment.

FIG. 5A illustrates schematically an embodiment 95 which may be incorporated into the system of the FIGS. 1-3. Embodiment 95 has a tube bundle 104 extending between axial ends 103 and 105. The baffle 106 extends between axial ends 101 and 99. Intermediate the ends 103/105 and 101/99 there is an increased diameter section formed with an undulation 110 on the baffle 106 and a matching undulation 108 on the bundle 104. Undulation 110 extends between axial ends 111 and 112 and undulation 108 extends between axial ends 107 and 109. Notably, the entire undulation moves outwardly from a lesser diameter portion to a greater diameter portion, and then extends back inwardly to a lesser diameter portion such that the entire undulation is between the ends 103/105 and 99/101.

As shown in FIG. 5B, the load transfer at the interface of the undulation reduces or eliminates local shear stresses, since the force equilibrium can be handled by normal reactions N at the undulations. The orientation of the normal reactions N in FIG. 5B is shown for example of tension by force F. Thus, the leakage in the prior art is reduced or eliminated. Broadly, the undulation could be said to be a "changed diameter section" with sections of a distinct diameter on both axial ends of the changed diameter section, and intermediate an axial end of the baffle and bundle.

Figure 6A:
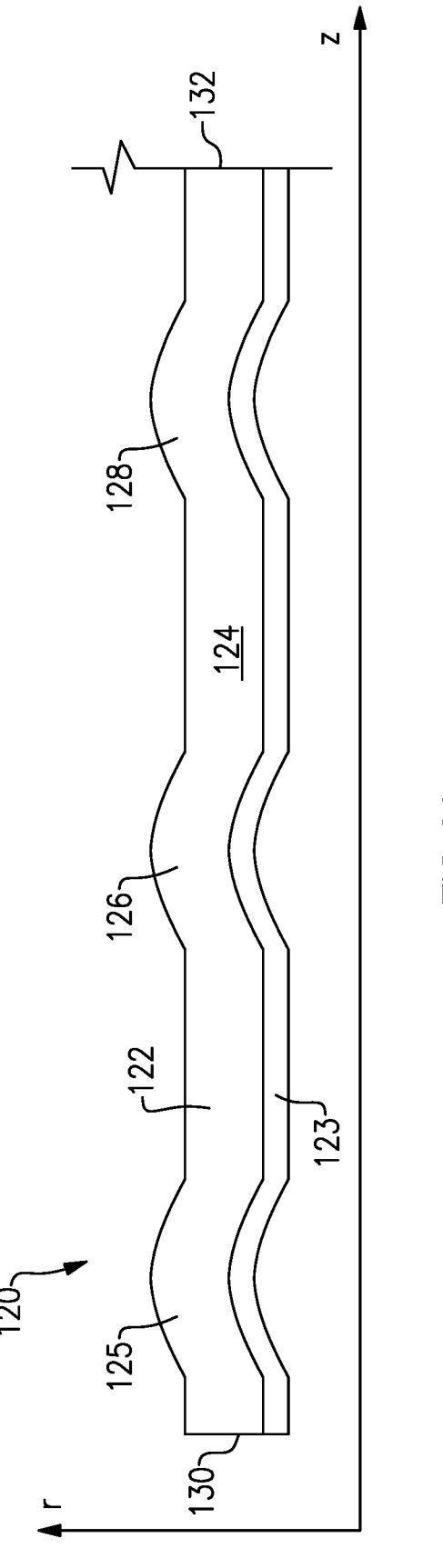
FIG. 6A shows a second embodiment gas removal system as an axial cross-sectional view.

FIG. 6A shows another embodiment 120 having a bundle 124 received on a mandrel 123 and extending between axial ends 130 and 132. Undulations 125, 126 and 128 are formed between the ends 130 and 132. Again, each undulation extends from a lesser diameter portion into a greater diameter portion and back into lesser diameter portion and intermediate the axial ends 130/132 of the baffle end fiber bundle.

FIGS. 5A and 6A have full hoop (i.e., axi-symmetric) undulations extending across 360 degrees about a central axis Z of the baffle 123.

Figure 6B:
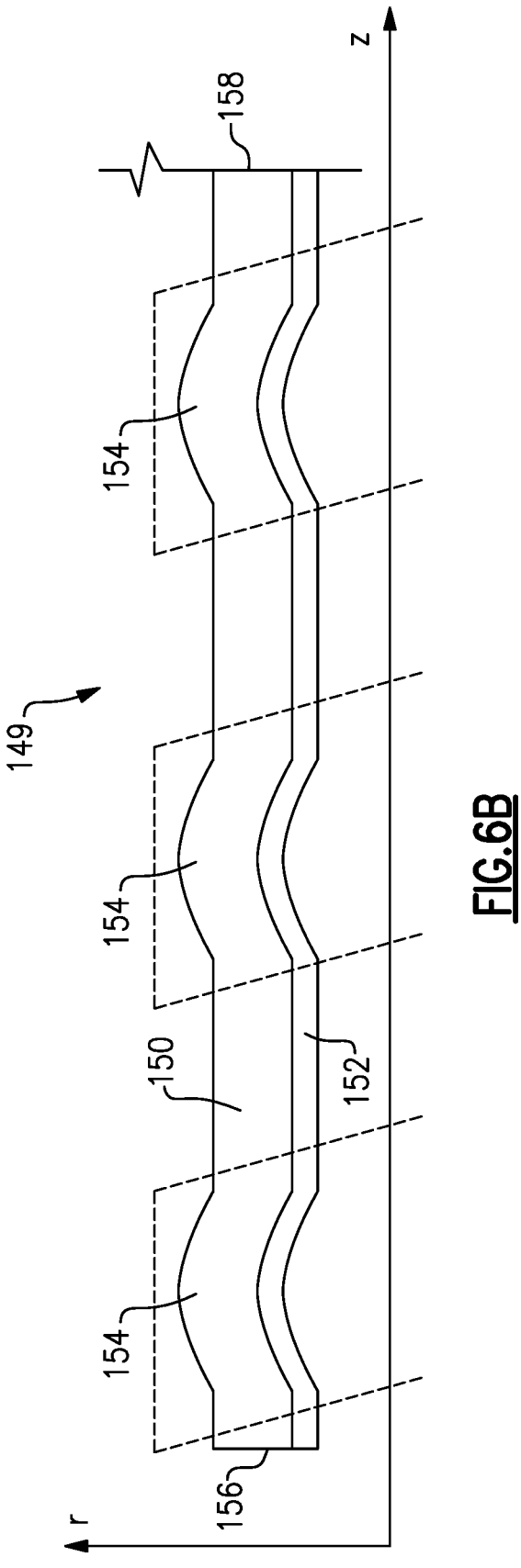
FIG. 6B shows yet another embodiment gas removal system as an axial cross-sectional view.

FIG. 6B shows another embodiment 149 having an undulation 154 extending spirally between axial ends 156 and 158 and formed in both the bundle 150 and baffle 152. The spiral could be defined as extending along an angle which is non-zero along the radial direction R of the assembly.

FIG. 7A shows an assembly 160 of a bundle 162 and baffle 164, and having an undulation at 166. The undulation is generally formed on a single curve.

FIG. 7B shows an alternative undulation shape 166 which could be a combination of several curved portions such that the curve changes with portions 167 at axial ends of the undulation 166 which are of a smaller radius of curvature, and intermediate portions 169 having a greater radius of curvature.

FIG. 7C shows an embodiment 170 wherein the undulation 174 has portions 171 and 177 at the axial ends which are of a lesser radius of curvature, portions 172 and 176 which are close to linear than portions 172 and 174, and an intermediate curved portion 174 at the outermost diameter portion.

FIG. 7D shows an embodiment 160 having curved portions 181 and 192 at the axial ends leading into relatively linear portions 182 and 190, curved portions 184 and 188, and a generally linear portion 186. The linear portions at FIGS. 7C and 7D can be arranged parallel to the axis Z or under some non-zero angle. Overall, shapes of undulations described in FIGS. 7B-7D can be defined according to an optimization analysis, accounting for available manufacturing capabilities and selected criteria of structural performance.

Figures 8A, 8B:
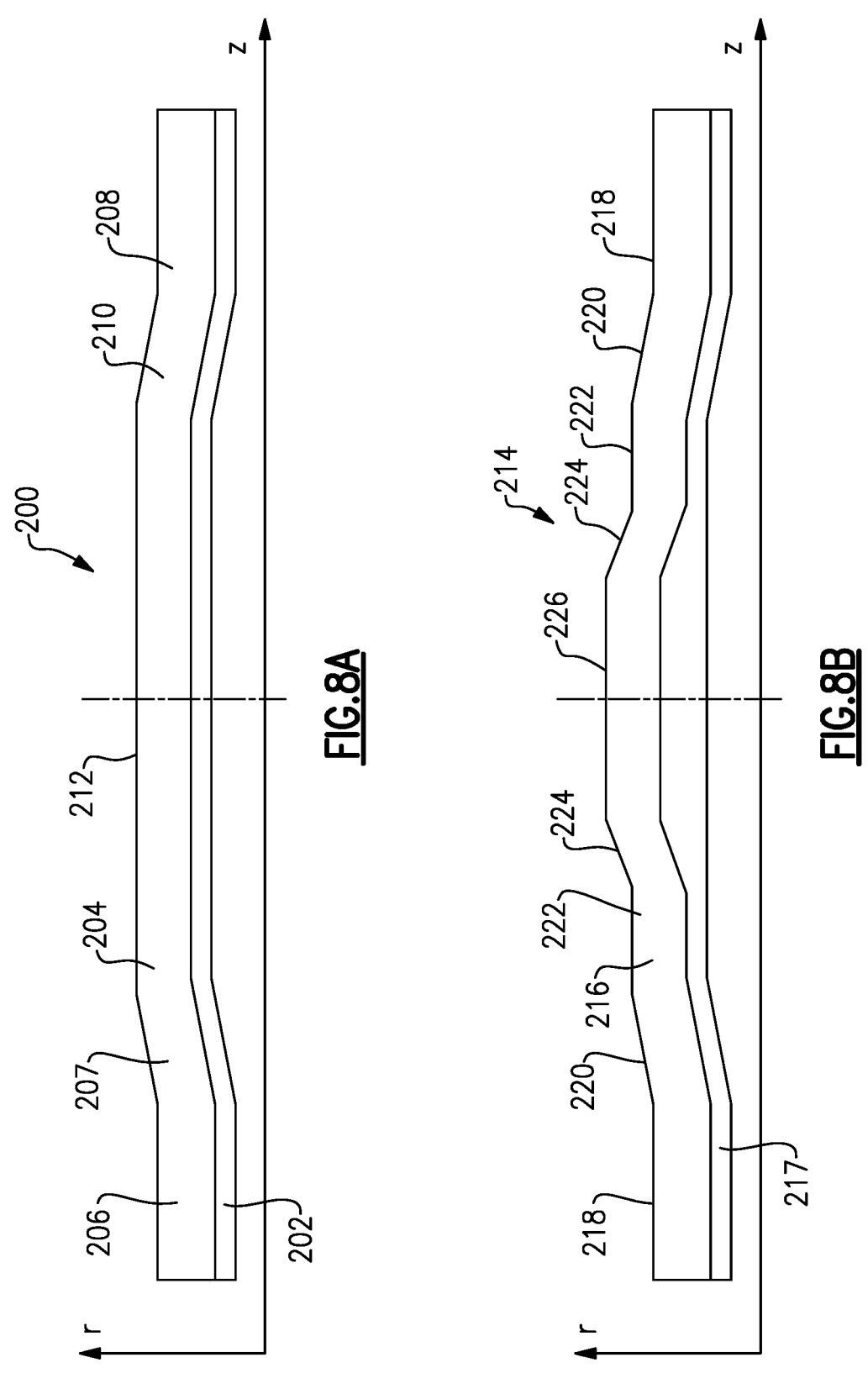
FIG. 8A shows another embodiment gas removal system as an axial cross-sectional view.
FIG. 8B shows yet another embodiment gas removal system.

FIG. 8A shows an embodiment 200 wherein the changed diameter portion is provided with an increased diameter portion 212 on the bundle 204 and the baffle 202 which is not curved. Instead, there are lesser diameter portions 206 and 208 in each of elements 202 and 204, and adjacent their axial ends with increasing portions 207 and 208 increasing to the greatest diameter portion 212. The portions are all linear.

FIG. 8B shows yet another embodiment 214 wherein the baffle 217 and bundle 216 have smaller diameter axial ends 218 leading into ramped portions 220 extending for a greater diameter, and leading into portions 222 which are generally linear and parallel to a central axis Z, and leading into ramped portions 224 extending to an even greater outer diameter portion 226. Again, the changing diameter portions are all linear.

Figures 9A, 9B, 9C:
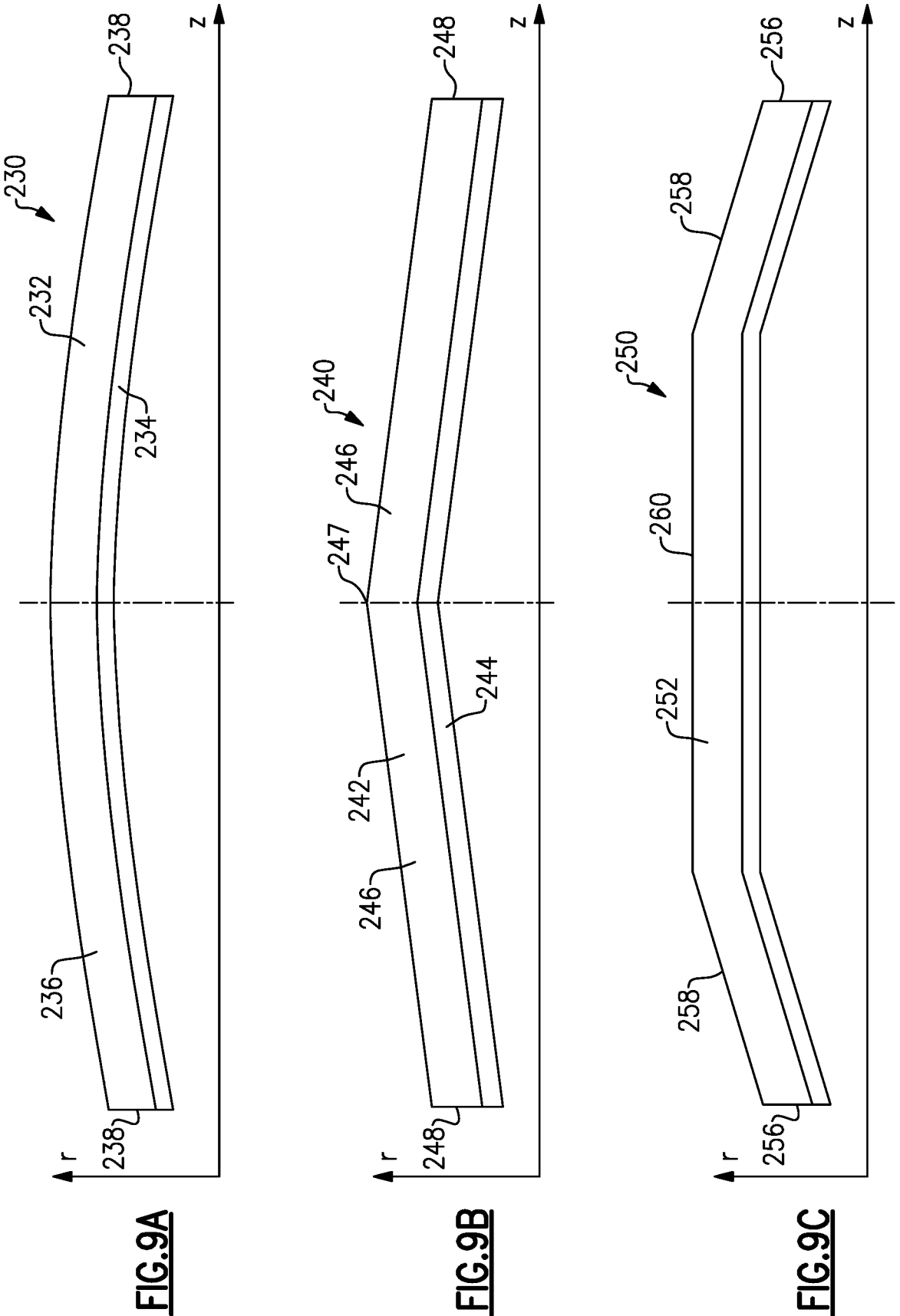
FIG. 9A shows yet another embodiment gas removal system as an axial cross-sectional view.
FIG. 9B shows yet another embodiment gas removal system.
FIG. 9C shows yet another embodiment gas removal system.

FIG. 9A shows an embodiment 230 wherein the bundle 232 and 236 each extend between axial ends 238 such that their diameter increases along the entire length, creating a convex shape.

FIG. 9B shows an embodiment wherein the bundle 242 and baffle 244 extend between axial ends 248 with outwardly ramped portions 246 extending to a greatest diameter portion 247.

FIG. 9C shows an embodiment 250 having a bundle 252 and a baffle 254 extending between axial ends 256 with ramped portions 258 leading into a greatest diameter portion 260.

Figures 10A, 10B:
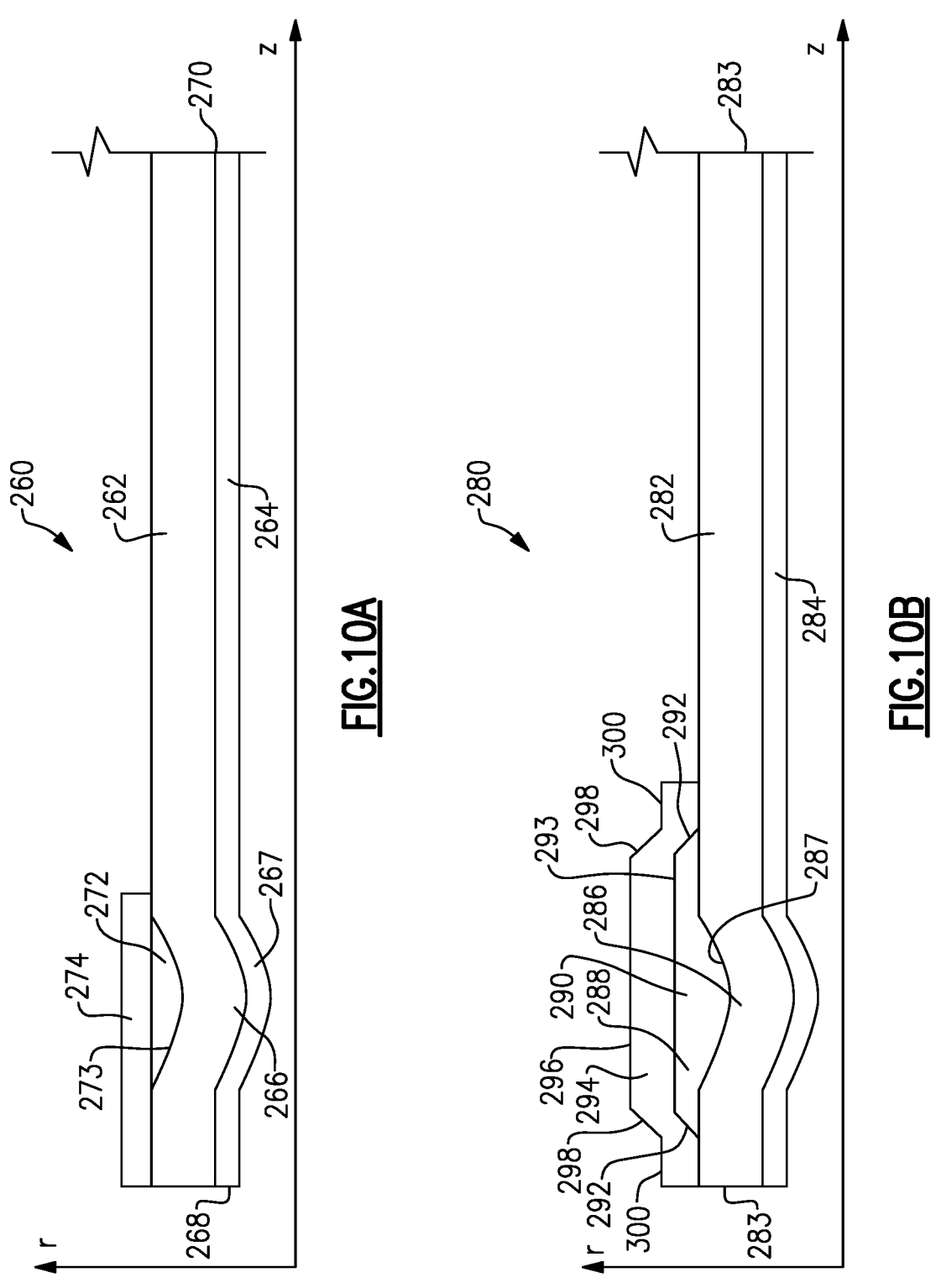
FIG. 10A shows yet another embodiment gas removal system as an axial cross-sectional view.
FIG. 10B shows yet another embodiment gas removal system as an axial cross-sectional view.

FIG. 10A shows an embodiment 260 wherein the bundle 262 and the baffle 264 extend between axial ends 268 and 270. An undulation 266 and 267 extends radially inwardly to provide a changed smaller diameter portion.

Again, the locking function will be achieved. The various other shapes of each of the earlier embodiments could be incorporated to extend radially inwardly to reduce the change diameter portion.

In FIG. 10A there is an optional plug 272 filling a depression 273 formed by the radially inward extending undulation 266. A jacket, such as a polymeric jacket, and in one embodiment an epoxy jacket 274 may be secured outwardly of the plug 272.

FIG. 10B shows an embodiment 280 again having a radially inward extending undulation 286 in the bundle 282 and the baffle 284, and extending between ends 283. Here, the depression 287 formed by the undulation is filled by a plug 290 having ramped axially outer ends 292 leading into an enlarged central portion 293. A jacket 294 may be placed outwardly of the plug 290 and has linear portions 300 at axial ends, and increasing diameter ramped portions 298 leading to a greater diameter portion 296.

A material for plugs 272 and 290 can be uni-directionally positioned fibers extending generally in the hoop orientation. "Generally in the hoop orientation" is defined as 90 degrees with respect to the axial direction. In other embodiments, the fiber can be oriented at some angle β with respect to the axial direction, where angle β can be within −75 and +75 deg. Furthermore, in other embodiments, the fiber can also be arranged as [+β/−β] layup with a similar range of β within −75 and +75 degrees. All of these should be seen as generally in the hoop orientation. The fiber can be any of organic, glass or carbon fibers. The fibers can be placed within a polymeric material. Geometrically, these plugs represent ring-type axi-symmetric, or full hoop bodies.

Each of the embodiments disclosed have a changed diameter portion which provides the benefits as mentioned above.

A gas removal system under this disclosure could be said to include an interior baffle having flow channels and a central fluid receiving chamber. A membrane fiber bundle is placed outwardly of the interior baffle. The interior baffle and the fiber bundle extend between axial ends. A changed diameter portion is intermediate the axial ends. Each of the interior baffle and the membrane fiber bundle change in diameter in a first direction and then return in a second direction changing diameter in an opposed way from the first direction. The changed diameter portion is intermediate the axial ends. The membrane fiber bundle is formed of fibers that allow the passage of gas through an outer wall, but resist the passage of liquid.

Although embodiments have been disclosed, a worker of skill in this art would recognize that modifications would come within the scope of this disclosure. Thus, the following claims should be studied to determine the true scope and content.

What is claimed is:

1. A gas removal system including an interior baffle with an outside surface having flow channels and a central fluid receiving chamber;

a membrane fiber bundle with an inside surface and contacting the outside surface of the interior baffle, wherein the membrane fiber bundle is formed of fibers that allow the passage of gas through an outer wall, but resist the passage of fluid with the inside surface of the fiber bundle partially contacting the outside surface of the baffle, and the interior baffle and the fiber bundle extending between axial ends; and both the interior baffle and the membrane fiber bundle being circular in cross-section, and a changed diameter portion intermediate the axial ends wherein each of the outside surface of the interior baffle and the inside surface of the membrane fiber bundle change in diameter in a first direction and then return in a second direction changing diameter in an opposite radial direction from the first direction, such that the changed diameter portion is intermediate the axial ends.

2. The system as set forth in claim 1, wherein the changed diameter portion is generally a radially outward undulation.

3. The gas removal system as set forth in claim 1, wherein there are a plurality of changed diameter portions between the axial ends.

4. The gas removal system as set forth in claim 3, wherein the changed diameter portions are undulations extending axi-symmetrically about a central axis of the interior baffle.

5. The gas removal system as set forth in claim 1, wherein the changed diameter portion extends in the first direction radially inwardly for a first portion to decrease the diameter, and then a second portion returns in the second direction to increase the diameter such that axial sections on each of two axial ends of the changed diameter portion have a greater diameter than the changed diameter portion.

6. The gas removal system as set forth in claim 1, wherein the changed diameter portion is a single undulation extending along an angle with respect to the diametric cross-section to define a generally spiral shape, and between the axial ends of the membrane fiber bundle and interior baffle.

7. The gas removal system as set forth in claim 1, wherein the changed diameter portion is an undulation formed of curves.

8. The gas removal system as set forth in claim 7, wherein there are a plurality of distinct curved portions forming the undulation.

9. The gas removal system as set forth in claim 7, wherein the undulation has generally linear portions which extend along a lesser radius of curvature than adjacent curved portions of the undulation.

10. The gas removal system as set forth in claim 1, wherein the changed diameter portion is formed of linear segments.

11. The gas removal system as set forth in claim 1, wherein the changed diameter portion extends across an entire distance between the axial ends of the membrane fiber bundle and barrier.

12. The gas removal system as set forth in claim 11, wherein the changed diameter portion extends along a curve.

13. The gas removal system as set forth in claim 1, wherein the changed diameter portion extends at a non-parallel angle relative to a central axis to form a spiral.

14. The gas removal system as set forth in claim 1, wherein the changed diameter portion extends radially inwardly to define a smaller diameter portion in each of the membrane fiber bundle and barrier, with greater diameter portions on each of two axial sides.

15. The gas removal system as set forth in claim 14, wherein there is an axi-symmetric plug formed in a depression in the membrane fiber bundle formed by the changed diameter portion.

16. The gas removal system as set forth in claim 15, wherein the plug is formed by continuous fibers extending generally in a hoop direction.

17. The gas removal system as set forth in claim 15, wherein an outer jacket is positioned around the plug.

18. The gas removal system as set forth in claim 1, wherein the tubes are formed of a coated microporous polyetherketone.

19. A fuel system comprising:

a source of fuel, a gas removal system, and a combustor of a gas turbine engine connected downstream of the gas removal system, wherein the gas removal system includes an interior baffle with an outer surface having flow channels and a central fluid receiving chamber;

a membrane fiber bundle with an inside surface contacting the outside surface of the interior baffle, the membrane fiber bundle is formed of fibers that allow the passage of gas through an outer wall, but resist the passage of liquid and the interior baffle and the fiber bundle extending between axial ends; and both the interior baffle and the membrane fiber bundle being circular in cross-section, and a changed diameter portion intermediate the axial ends wherein each of the outside surface of interior baffle and the inside surface of the membrane fiber bundle change in diameter in a first direction and then return in a second direction changing diameter in an opposite radial direction from the first direction, such that the changed diameter portion is intermediate the axial ends.

20. The fuel system as set forth in claim 19, wherein there are a plurality of changed diameter portions between the axial ends.

\* \* \* \* \*